US011983765B2

(12) United States Patent
Rilett et al.

(10) Patent No.: US 11,983,765 B2
(45) Date of Patent: May 14, 2024

(54) DISTRIBUTED ENERGY TRADING WITH BLOCKCHAIN SETTLEMENT

(71) Applicant: Distro Energy B.V., Rotterdam (NL)

(72) Inventors: James Rilett, London (GB); Isabel Tang, London (GB); Mark Gilleeney, London (GB); Janjoost Jullens, Rotterdam (NL); Raza Hassan, London (GB); Jan-Gerrit Harms, Rotterdam (NL); Sandor Ivancsics, Rotterdam (NL)

(73) Assignee: Distro Energy B.V., Rotterdam (NL)

( * ) Notice: Subject to any disclaimer, the term of this patent is extended or adjusted under 35 U.S.C. 154(b) by 309 days.

(21) Appl. No.: 17/652,579

(22) Filed: Feb. 25, 2022

(65) Prior Publication Data
US 2023/0274345 A1    Aug. 31, 2023

(51) Int. Cl.
*G06Q 30/08* (2012.01)
*G06Q 50/06* (2012.01)
*G06Q 50/60* (2024.01)
*G16Y 20/30* (2020.01)

(52) U.S. Cl.
CPC .............. *G06Q 30/08* (2013.01); *G06Q 50/06* (2013.01); *G16Y 20/30* (2020.01); *G06Q 2220/00* (2013.01)

(58) Field of Classification Search
None
See application file for complete search history.

(56) References Cited

U.S. PATENT DOCUMENTS

| 9,813,518 | B2 * | 11/2017 | Singer | H04L 65/612 |
| 11,258,682 | B2 * | 2/2022 | Kavanagh | H04L 43/02 |
| 11,410,219 | B2 * | 8/2022 | Vega | G06Q 50/06 |
| 11,614,473 | B2 * | 3/2023 | Schacht | G01R 21/133 |
| | | | | 702/61 |
| 11,682,009 | B2 * | 6/2023 | Ikemoto | G06Q 30/06 |
| | | | | 705/44 |
| 11,817,704 | B2 * | 11/2023 | Rilett | G06Q 50/06 |

(Continued)

OTHER PUBLICATIONS

Saur, R., et al. "Towards Optimal Demand-Side Bidding in Parallel Auctions for Time-Shiftable Electrical Loads," {Abstract only] 2020 IEEE18th International Conference on Industrial Informatics (INDIN): 340-7. IEEE. (Year: 2020).*

(Continued)

*Primary Examiner* — Nicholas D Rosen
(74) *Attorney, Agent, or Firm* — Yee & Associates, P.C.

(57) ABSTRACT

Distributed energy trading settlement is provided. The method comprises polling a number of Internet-of-Things (IoT) devices for energy consumption and production data for a specified preceding time interval and receiving weather data from a weather application programming interface (API) for the same time interval. A number of bids and offers are received from a central modelling solution within a specified trading window, based on the data from the IoT devices and weather API. Orders are then created from the bids and offers. At least a subset of the orders are matched to create a number of matched trades, which are published to a message queue. The published matched trades are committed as transactions in a blockchain, and tokens are transferred between user wallets according to the transactions in the blockchain.

30 Claims, 7 Drawing Sheets

(56) References Cited

U.S. PATENT DOCUMENTS

| | | | | |
|---|---|---|---|---|
| 2016/0150045 | A1* | 5/2016 | Singer | H04L 67/565 |
| | | | | 709/203 |
| 2017/0178158 | A1* | 6/2017 | Chen | G06Q 30/0202 |
| 2018/0240201 | A1* | 8/2018 | Eda | G06Q 40/04 |
| 2019/0044836 | A1* | 2/2019 | Kavanagh | G06F 11/3006 |
| 2020/0333866 | A1* | 10/2020 | Dunbar | G05F 1/66 |
| 2021/0125253 | A1* | 4/2021 | Vega | H04L 67/12 |
| 2021/0264414 | A1* | 8/2021 | Ikemoto | G06Q 20/308 |
| 2021/0302479 | A1* | 9/2021 | Schacht | G01D 4/004 |
| 2021/0334914 | A1* | 10/2021 | Sadot | G06N 20/00 |
| 2024/0087035 | A1* | 3/2024 | Mitchell | G06Q 50/06 |

OTHER PUBLICATIONS

Lee, S., "P2P Power Trading between Nanogrid Clusters Exploiting Electric Vehicles and Renewable Energy Sources," Proceedings—2021 International Conference on Computational Science and Computational Intelligence, CSCI 2021: 1849-1855. Institute of Electrical and Electronics Engineers Inc. (Year: 2021).*

* cited by examiner

DISTRIBUTED ENERGY TRADING WITH BLOCKCHAIN SETTLEMENT

BACKGROUND INFORMATION

1. Field

The present disclosure relates generally to an improved computing system, and more specifically to a distributed trading system for buying and selling electricity on a smart energy grid.

2. Background

A smart grid integrates communication networks with underlying electrical networks. Users/customers of the smart grid, while buying electricity from the grid when needed, increasingly generate their own electricity and sell it back to the grid when possible. Smart meters are implemented at the customers' end to communicate with the smart grid on price, and demand and supply information. Distributed trading agents can be implemented to trade energy on behalf of customers. The trading agents rely on several optimization algorithm to maximize efficiency.

With the advancement of small-scale energy producing technology and battery technology, energy consumers face many more options of how to use, store, or trade energy on a smart grid. Energy can be traded for different time slots and intervals, ranging from several minutes to months and can be traded through direct purchase transactions, auctions, or tariff contracts. Adding to the complication, multiple smart appliances may consume energy differently depending on the availability and price of energy at different times.

Therefore, it would be desirable to have a method and apparatus that take into account at least some of the issues discussed above, as well as other possible issues.

SUMMARY

An illustrative embodiment provides a computer-implemented method of distributed energy trading settlement. The method comprises polling a number of Internet-of-Things (IoT) devices for energy consumption and production data for a specified preceding time interval and receiving weather data from a weather application programming interface (API) for the same time interval. A number of bids and offers are received from a central modelling solution within a specified trading window, based on the data from the IoT devices and weather API. Orders are then created from the bids and offers. At least a subset of the orders are matched to create a number of matched trades, which are published to a message queue. The published matched trades are committed as transactions in a blockchain, and tokens are transferred between user wallets according to the transactions in the blockchain.

Another illustrative embodiment provides a system for distributed energy trading settlement. The system comprises a storage device configured to store program instructions and one or more processors operably connected to the storage device and configured to execute the program instructions to cause the system to: poll a number of Internet-of-Things (IoT) devices for energy consumption and production data for a specified preceding time interval; receive weather data from a weather application programming interface (API) for the specified preceding time interval; receive, from a central modelling solution, a number of bids and offers, within a specified trading window, based on the data from the IoT devices and weather API; create orders from the bids and offers; match at least a subset of the orders to create a number of matched trades; publish the matched trades to a message queue; commit the published matched trades as transactions in a blockchain; and transfer tokens between user wallets according to the transactions in the blockchain.

Another illustrative embodiment provides a computer program product for distributed energy trading settlement. The computer program product comprises a computer-readable storage medium having program instructions embodied thereon to perform the steps of: polling a number of Internet-of-Things (IoT) devices for energy consumption and production data for a specified preceding time interval; receiving weather data from a weather application programming interface (API) for the specified preceding time interval; receiving, from a central modelling solution, a number of bids and offers, within a specified trading window, based on the data from the IoT devices and weather API; creating orders from the bids and offers; matching at least a subset of the orders to create a number of matched trades; publishing the matched trades to a message queue; committing the published matched trades as transactions in a blockchain; and transferring tokens between user wallets according to the transactions in the blockchain.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that customers of the smart grid, in addition to buying electricity, also might generate their own electricity and sell it back to the grid when possible. Smart meters might be implemented at the customers' end to communicate with the smart grid on price, and demand and supply information.

The illustrative embodiments also recognize and take into account that Distributed trading agents are implemented to trade energy on behalf of customers. Trading agents rely on several optimization algorithms to maximize efficiency.

The illustrative embodiments integrates smart grid trading with blockchain technology. The illustrative embodiments provide a smart agent system that facilitates peer-to-peer trading between smart agents representing buyers and sellers of electrical power within a smart power grid. The illustrative embodiments provide a marketplace that facilitates and governs a forward market (e.g., 48-hour, 24-hour), secured and validated by blockchain protocol. Predictive modelling and artificial intelligence for real-time strategic trade allow for both individual and community-wide optimization of costs and net balance. A permissioned blockchain records, validates, and settles each trade. Energy is tokenized and the transaction is recorded as trades of tokens.

Figure 1:
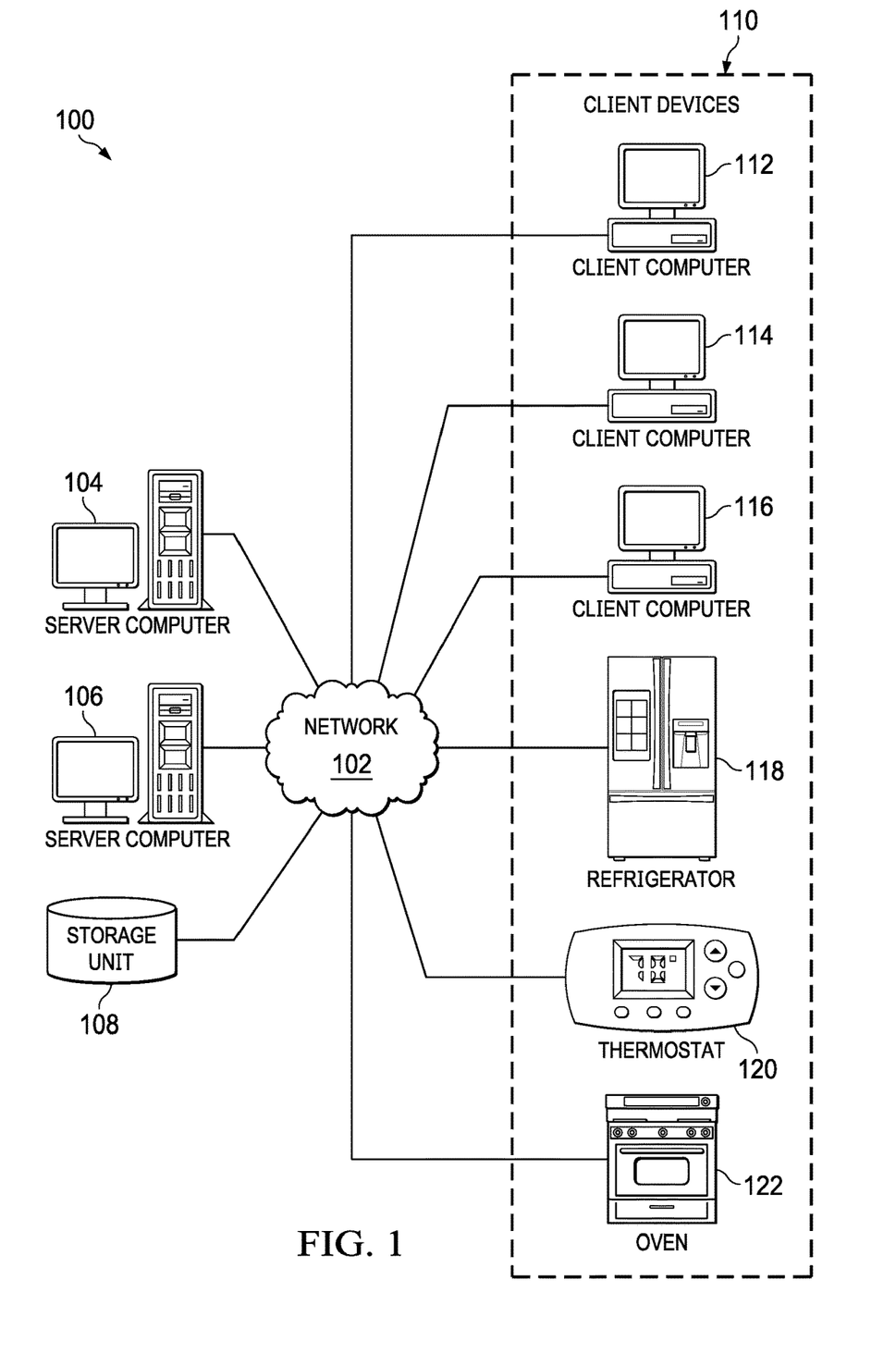
FIG. 1 depicts a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as refrigerator 118, thermostat 120, and oven 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
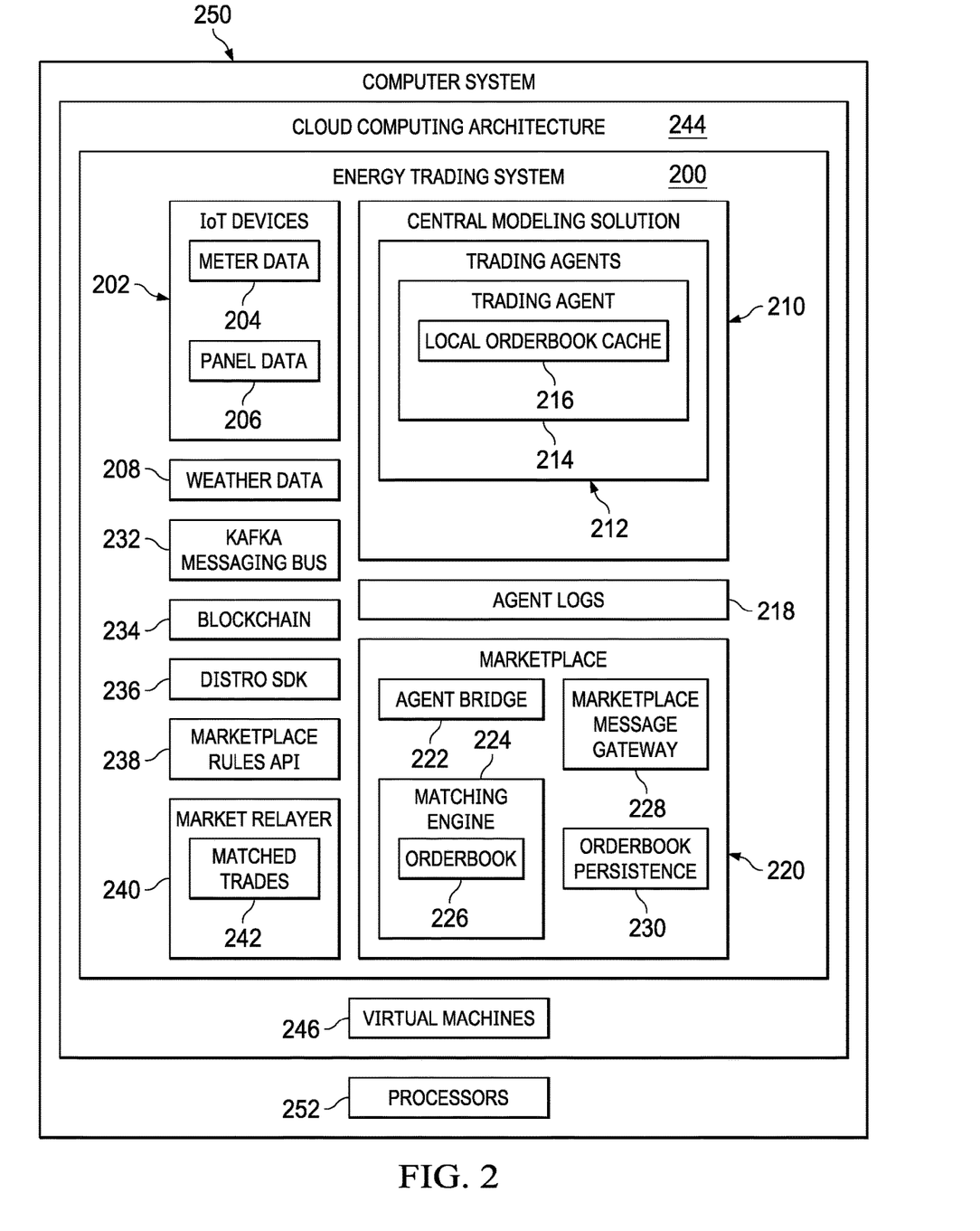
FIG. 2 depicts a block diagram of an energy trading system depicted in accordance with an illustrative embodiment.

FIG. 2 is a block diagram of an energy trading system depicted in accordance with an illustrative embodiment. Energy trading system 200 might be implemented in network data processing system 100 in FIG. 1.

Energy trading system 200 comprises meter data 204 and panel data 206 provided by IoT devices 202, as well as weather data 208. Weather data 208 might be provided by a weather service (e.g., Darksky) and comprise weather forecasts for specified regions over a specified time window (e.g., the next 48 hours) at a pre-determined frequency (e.g., five-minute intervals). Meter data 204 is provided by IoT electrical use meters of registered users of the energy trading system 200. The meter data 204 may be retrieved from in a look-back time window (e.g., last 48 hours) at a pre-determined frequency (e.g., five-minute intervals). Panel data 206 may be provided by IoT solar panels of registered users of the energy trading system 200 and may also be retrieved in a look-back fashion similar to meter data 204. Together, meter data 204, panel data 206, and weather data 208 may be used to estimate electrical energy consumption and production within a smart grid over a specified time window.

Central modelling solution (CMS) 210 hosts a number of smart trading agents 212. Each trading agent 214 may comprise a local orderbook cache 216. Trading agents 212 may use neural network models to place bids and offers and can sign orders.

Marketplace 220 comprises agent bridge 222, matching engine 224, marketplace message gateway 228, and orderbook persistence 230. Agent bridge 222 passes meter data 204, panel data 206, weather data 208, and other data to CMS 210 and receives offers and bids from CMS 210 generated by trading agents 212. Matching engine 224 comprises orderbook 226 containing offers and bids received from trading agents 212.

Agent logs 218 store all bids and offers from trading agents 212 and are used for final validation of marketplace matched trades.

Market relayer 240 comprises matched trades 242. Blockchain 234 ensures the security and integrity of transactions in marketplace 220. Market relayer 240 subscribes to matched trades published by marketplace 220 and provides final validation of signed orders. Market relayer 240 provides a service of validating signed orders before passing them to the blockchain 234 for settlement. The architecture of the illustrative embodiments provides off-chain relay and on-chain settlement. Orders are cryptographically signed by the token owner to ensure security but not broadcast to the blockchain 234 until the transaction is final, which takes bloat off the chain by only broadcasting the final outcome of the transaction to the blockchain.

Marketplace rule API 238 receives the latest market rules (e.g., wallet, pMin, pMax), which are provided to trading agents 212 and marketplace 220. Distro software development kit (SDK) 236 enforces market rules received from the blockchain 234.

Kafka messaging bus 232 can be used to transfer information between elements of energy trading system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Energy trading system 200 may be deployed in a cloud computing architecture 244 comprising a number of virtual machines 246. Virtual machines 246 emulate a computer system in software to provide the functionality of a physical computer. Up to several thousand virtual machines 246 may be hosted on a single physical system, such as computer system 250, allowing the cloud computing architecture 244 to scale up or scale down resources as needed.

The components for energy trading system 200 and cloud computing architecture 244 can be located in computer system 250, which is a physical hardware system and includes one or more data processing systems. When more than one data processing system is present in computer system 250 those data processing systems are in communication with each other using a communications medium. The communications medium can be a network. The data processing systems can be selected from at least one of a computer, a server computer, a tablet computer, or some other suitable data processing system.

For example, energy trading system 200 can run on one or more processors 252 in computer system 250. As used herein a processor is a hardware device and is comprised of hardware circuits such as those on an integrated circuit that respond and process instructions and program code that operate a computer. When processors 252 execute instructions for a process, one or more processors can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

Figure 3:
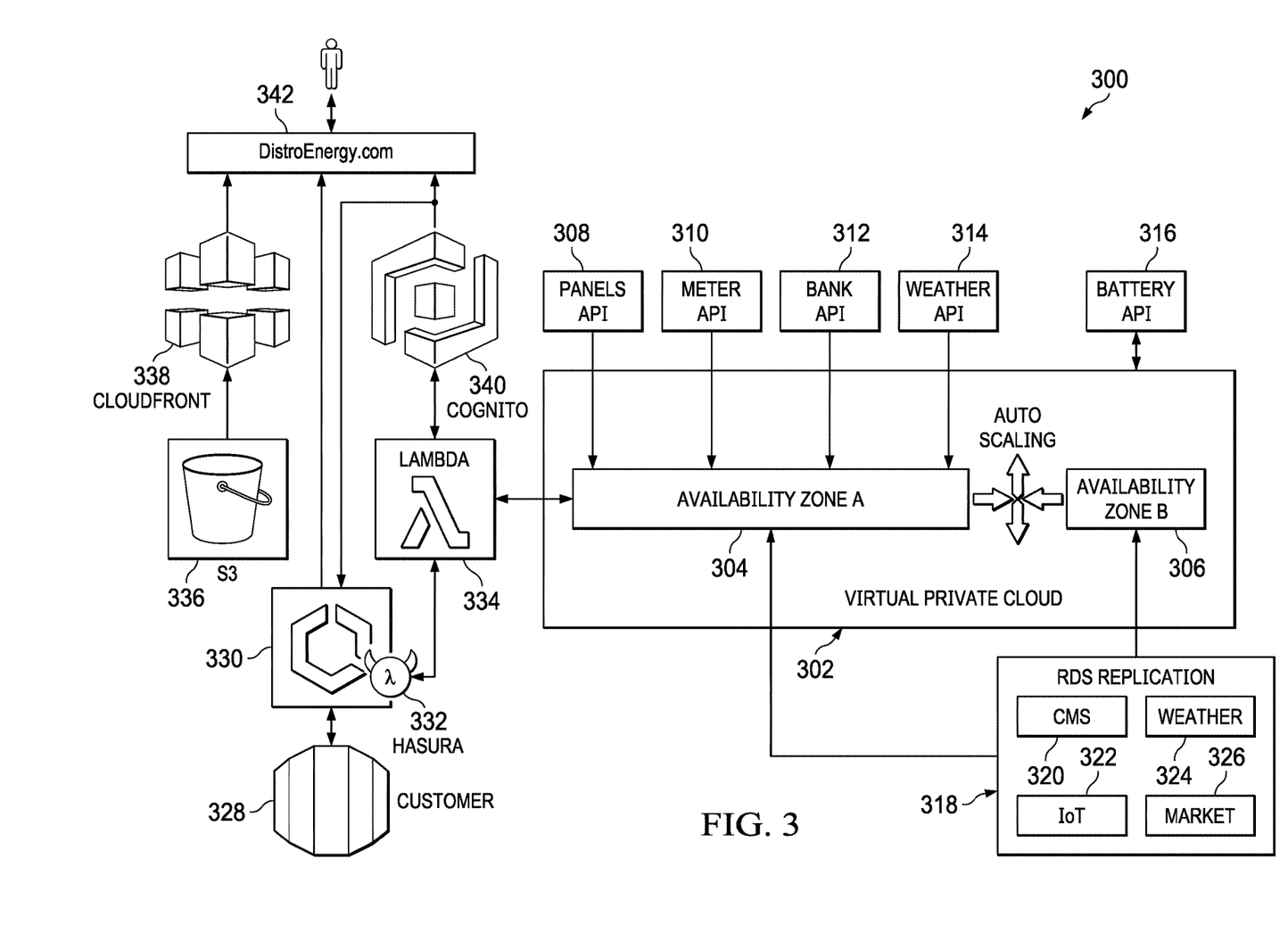
FIG. 3 depicts a diagram illustrating an architecture for an energy trading system in accordance with an illustrative embodiment.

FIG. 3 depicts a diagram illustrating an architecture for an energy trading system in accordance with an illustrative embodiment. Architecture 300 may be an example implementation of energy trading system 200 in FIG. 2.

Architecture 300 comprises a virtual private cloud (VPC) 302 that may be implemented with a service such as, e.g., Amazon Web Services (AWS). VPC 302 may be automatically scaled to include multiple availability zones. In the present example, VPC 302 comprises availability zone A 304 and availability zone B 306, which serve as logical data centers in regions available for use by AWS customers. Each availability zone has redundant and separate power, networking, and connectivity.

The availability zones 304, 306 communicate with external application programming interfaces (APIs) to gather information related to energy consumption and production as well as to execute financial transactions in connection with energy trades. These external APIs may include a panels API 308 for solar panels, an electrical meter API 310, bank API 312, weather API 314 (e.g., Darksky), and battery API 316.

Relational database services (RDS) 318 are managed database instances provided by AWS, which serve as the datastore for many of the microservices such as central modelling solution (CMS) 320, IoT 322, weather 324, and market 326. Typically, these databases use the MySQL or Postgress database engine. Each of them is configured to have multiple availability zones and encrypted backups in line with prescribed data storage and disaster recovery policies.

Customer 328 uses architecture 300 to interact with a microgrid electricity trading platform 342 such as Distro Energy. Elastic Container Service (ECS) 330 may employ Hasura GraphQL Engine 332 and Lambda event-drive, serverless computing platform 334 to deploy availability zones (e.g., 304, 306) as needed. Cloudfront 338 may provide a content delivery network between the electricity trading platform 342 and ECS 330. Data and metadata for Cloudfront 338 may be stored in S3 bucket 336. Cognito 340 provides identity verification between the electricity trading platform 342 and architecture 300.

Figure 4:
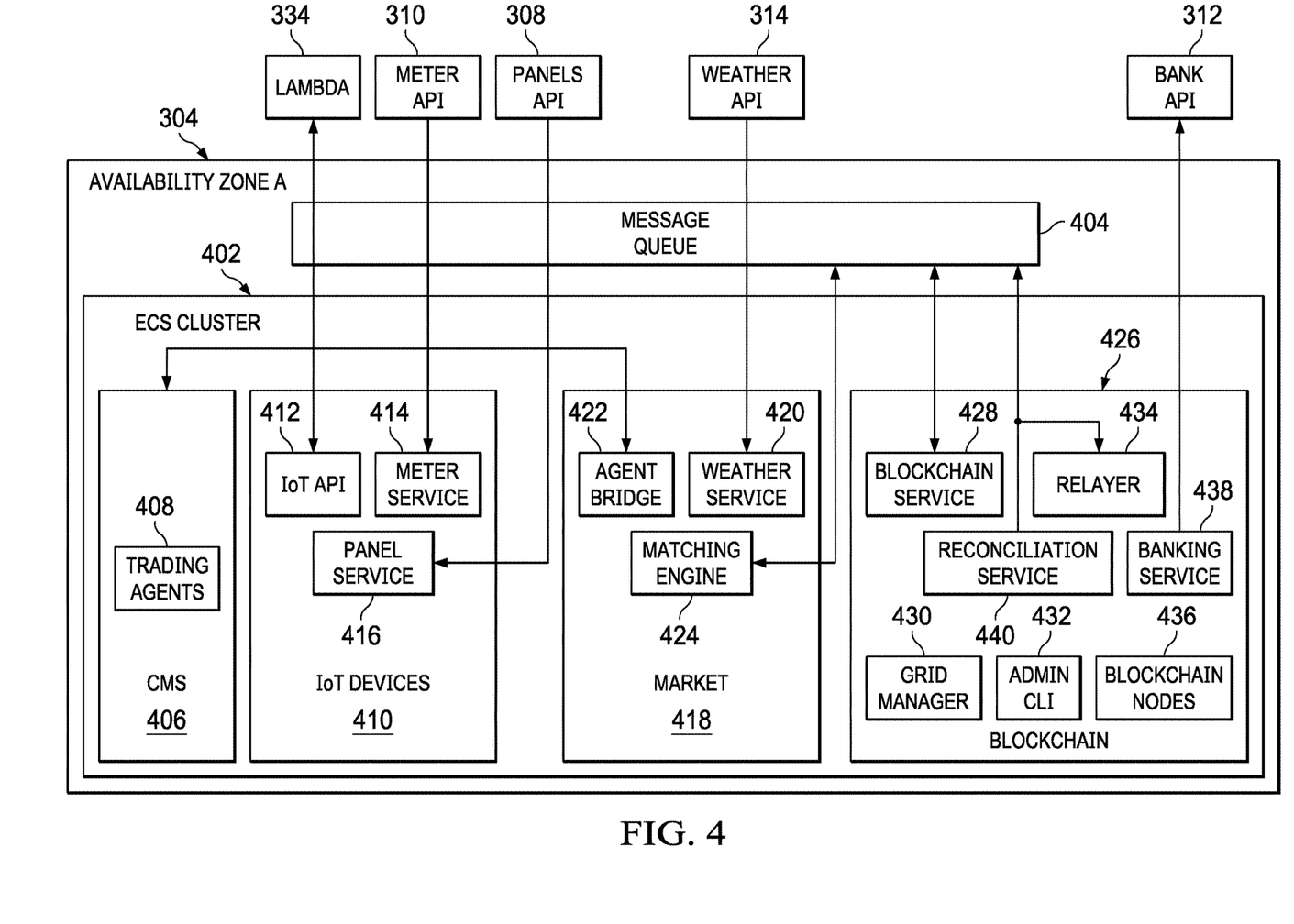
FIG. 4 depicts an availability zone within a virtual private cloud for an energy trading system in accordance with an illustrative embodiment.

FIG. 4 depicts an availability zone within a virtual private cloud for an energy trading system in accordance with an illustrative embodiment. FIG. 4 provides a more detailed view of availability zone A 304 in FIG. 3. Availability zone A 304 comprises an ECS cluster 402 and message queue 404.

ECS cluster 402 includes central modelling solution (CMS) 406, IoT devices microservices 410, market microservices 418, and blockchain 426.

CMS 406 is designed to be a horizontally scalable solution for making different models available to the underlying services. CMS 406 is invoked by the agent bridge 422 when the agent bridge passes it parameters such as weather data, energy consumption and production data, market orderbooks, and market rules. Trading agents 408 are the actual models hosted within the CMS 406. Once a model has been configured and trained using historic data it is moved to CMS 406 and made available to the agent bridge 422.

IoT devices microservice 410 is responsible for capturing and processing data from IoT devices typically, smart meters/meter services. This microservice is designed to be flexible enough to allow for interaction with most internet connected devices. Meter service 414 is a bespoke implementation specific to the location/provider of the smart meter. Its purpose is to fetch energy consumption and generation data from meter API 310 and submits the data to the IoT API 412 and Blockchain 426. Meter service 414 may adapt to different external API definitions based on the configuration parameters (e.g., smart meter manufacturer and available APIs). Once the data is captured it may be normalized and transformed to be consistent throughout the Distro platform. Panel service 416 captures, normalises, transforms and stores the data from solar panels provided through panels API 308. The IoT API 412 is an internal only API that makes the IoT devices microservice's data available to other services within the Distro Energy platform. For security reasons this API and its underlying databases may be maintained on a private network not connected to the Internet. Energy consumption and production data is saved once it received from the meter service 414. IoT API 412 may comprise two APIs: aggregated device usage, and a consumption/production API for summary.

Market service 418 comprises weather service 420, agent bridge 422, and matching engine 424. The weather service 420 is a microservice that ingests weather data from an external weather data API 314 and transforms the data into a format required by the CMS 406. This format comprises 48-hour historic weather data for a specific location in 15-minute increments and 48-hour forecast for the specific location in 15-minute increments. The agent bridge 422 is the connection between the CMS 406 and the matching engine 424. The agent bridge 422 is responsible for gathering all the parameter data needed for inferring an agent model from the CMS 406. The matching engine 424 is a trade matching engine that accepts bids and offers from trading agents 408 and matches them in the shortest amount of time possible. The matching engine conforms to many existing exchanges by using the Financial Information Exchange (FIX) protocol.

Blockchain 426 comprises blockchain service 428, grid manager 430, administrator command line interface (CLI) 432, relayer 434, blockchain nodes/peers 436, banking service 438, and reconciliation service 440. Blockchain service 428 is microservice responsible for monitoring and reporting blockchain related data to the rest of the system via the message queue 404. The following information is published to the message queue 404: reconciled values for each trading window (also known as programmed time unit (PTU)), and user wallet balances. Grid manager 430 is a microservice responsible for executing the reconciliation process. The administrator CLI 432 is a service that provides command line access to the blockchain application. The relayer 434 accepts published matched trades from the message queue 404 and creates transactions which are added to a Redis queue in order to control the frequency of transactions executed on the blockchain. Relayer 434 also checks the validity of matched trades by ensuring they are within the market rules and reports back to the matching engine 424. Due to the high frequency of trades from the matching engine 424 the illustrative embodiments marry the slow resilience of blockchain technology with the throughput from high frequency trading. The blockchain nodes/peers 436 support the operation and running of the private Ethereum blockchain application. The banking service 438 is an application used to interface between blockchain 426 and fiat currency banking APIs 312.

The message queue 404 is the central event hub for the entire Distro Energy application. All microservices use the message queue and/or internal APIs of message queue 404 to communicate with other microservices.

Each IoT device connected to the trading platform is polled for the latest energy (electricity) consumption and production data the devices have to offer. This data is processed, stored, and made available to the agent bridge 422.

Trading windows comprise a prescribed time interval (e.g., 15 minutes). At the start of each trading window the agent bridge 422 brings together data to start the first round of trading. The agent bridge 422 may comprise a configurable interval timer (e.g., two minutes +/−15% deviation for randomness). This timer ensures the agents 408 are inferred again with the latest data and unmatched orders from their previous inference cycles.

Data passed to the CMS typically comprises weather data, consumption/production data, market rules (pMin/pMax), and market orderbook. The data gathered above is formatted and passed to the CMS 406 to infer the trading agents 408. The agent bridge 422 waits for the CMS 406 to respond with a list of bids and offers generated by the trading agents.

Once a response is received from the CMS 406 the agent bridge 422 constructs orders that it will submit via the FIX protocol to the matching engine 424. The agent bridge 422 does not wait for a response from the matching engine 424. Instead, matched trades are published via message queue 404 by the matching engine 424, and the interval timer will trigger the next cycle of bids and offers.

When a trade (bid or offer) is matched with a counterparty the trade is published to the matched trades topic on the message queue 404. All trades not matched to a counterpart are published as the orderbook to the agents 408 via the message queue 404. Relayer 434 is subscribed to the matched trades topic on the message queue 404 and instantly receives the matched trades published by the matching engine 424. The matched trades go through basic validation steps to ensure: format, creation time for the given PTU is before the PTU starts, the PTU is in the currently active trading window, the matching price is within the market rules for the given PTU, and all valid trades are added to a priority queue. The matching engine 424 is notified of all invalid trades.

Relayer 434 takes the validated transactions from the Redis priority queue and creates the right transaction form and commits them to the blockchain 426. It is at this point euro tokens are transferred between user wallets during the execution of the smart contracts.

Once a period has elapsed the system will use the latest readings from the IoT devices to calculate the difference between the traded and actual volumes of energy produced or consumed. The difference will be reconciled, and again tokens are transferred between wallets. For example, if a 1 kWh of power was bought for 12 May 12:12 PM, once that delivery window (in this case 12 May 12:00-12:15 PM) has passed the actual consumed value can be obtained from the smart meter to calculate the difference.

The blockchain service 428 listens to events on the blockchain and pushes messages to the Kafka-processor which later pushes to message queue 404 notifying the other microservices on the status of transactions within the blockchain.

Figure 5:
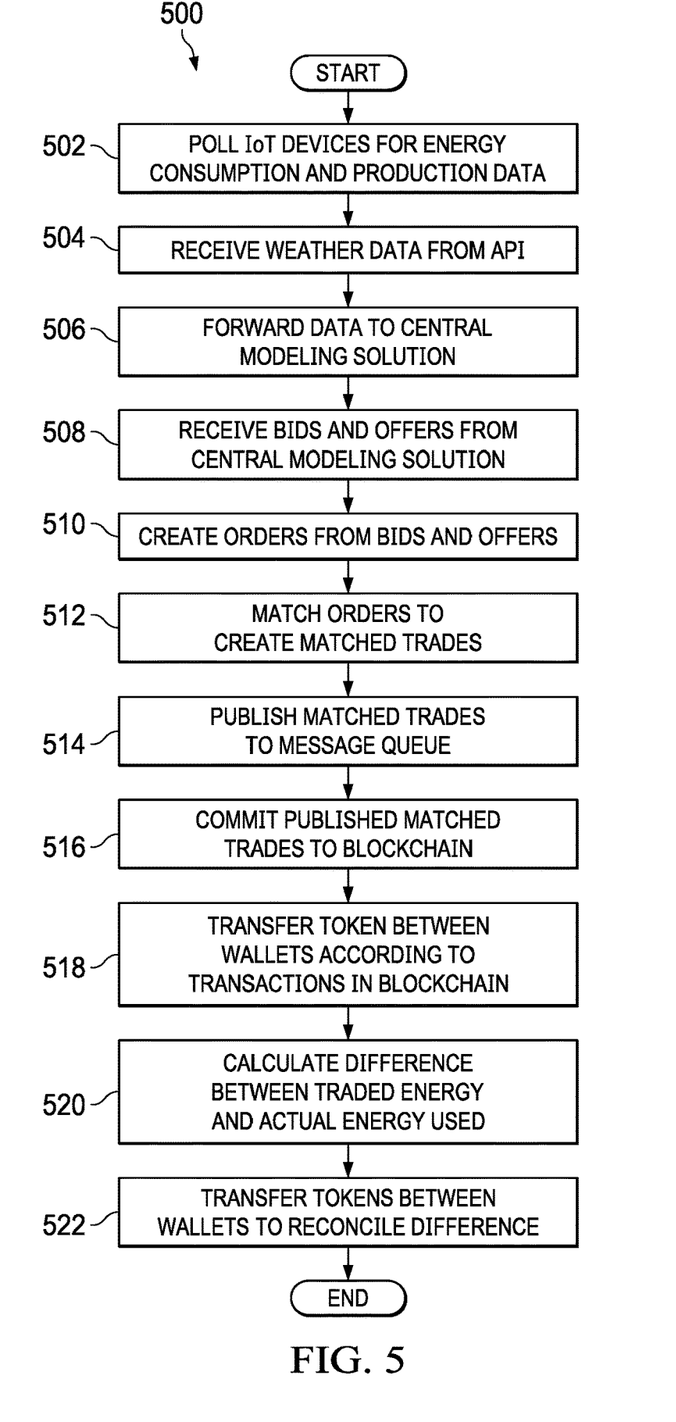
FIG. 5 depicts a flowchart illustrating a process for trading electrical energy in accordance with an illustrative embodiment.

FIG. 5 depicts a flowchart illustrating a process for trading electrical energy in accordance with an illustrative embodiment. Process 500 can be implemented in hardware, software, or both. When implemented in software, the process can take the form of program code that is run by one of more processor units located in one or more hardware devices in one or more computer systems. Process 500 might be implemented in energy trading system 200 in FIG. 2 and architecture 300 shown in FIGS. 3 and 4.

Process 500 begins by polling a number of Internet-of-Things (IoT) devices for energy consumption and production data for a specified preceding time interval (step 502). The system also receives weather data from a weather API for the specified preceding time interval (step 504). An agent bridge forwards this data to the central modeling solution (CMS) with other data by the agent bridge (step 506). The data supplied to the CMS may comprise comprising the weather data provided by the weather API, energy consumption provided by the IoT devices (e.g., smart meters/meter services), energy production provided by the IoT devices (e.g., smart meters/meter services), market rules comprising minimum and maximum prices, and a market orderbook.

A number of bids and offers are received from the CMS, within a specified trading window, based on the data from the IoT devices and weather API (step 508). The bids and offers may be generated by a number of trading agents that are hosted by the central modelling solution, wherein the trading agents are trained with historic energy use data and are linked to respective user profiles. The CMS may infer the trading agents with data provided by the agent bridge.

The specified trading window may comprise a number of cycles of bids and offers controlled by an interval timer within an agent bridge that transfer the data from the IoT devices to the central modelling solution.

Orders are then created from the bids and offers (step 510), and at least a subset of the orders are matched to create a number of matched trades (step 512). The orders may be submitted to a matching engine via Financial Information Exchange (FIX) protocol. Trades not matched among the orders are published as an orderbook to the trading agents via the message queue.

The matched trades are published to a matched trades topic on a message queue (step 514). A new cycle of bids and offers may be triggered within the trading window after the matched trades are published to the message queue.

The published matched trades are committed as transactions in a blockchain (step 516). The blockchain may validate each matched trade to ensure correct format, that the creation time of a programmed time unit (PTU) for the matched trade is before the PTU begins, that the PTU is within the specified trading window, and the matching price is within specified market rules for the PTU. Tokens are transferred between user wallets according to the transactions in the blockchain (step 518).

Process 500 may further comprise calculating a difference between traded energy volumes in the transactions for a time interval and the actual volume of energy used during that time interval, after that time interval has passed (step 520) and transferring tokens between the user wallets to reconcile the difference (step 522). Process 500 then ends.

Figure 6:
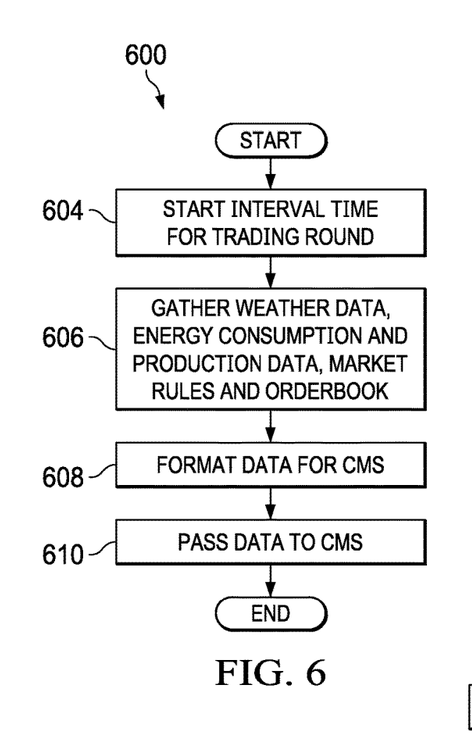
FIG. 6 depicts a flowchart illustrating a process for starting a trading round within a trading window in accordance with an illustrative embodiment.

FIG. 6 depicts a flowchart illustrating a process for starting a trading round within a trading window in accordance with an illustrative embodiment. Process 600 is a more detailed example of step 506 in FIG. 5, which is performed by the agent bridge, such as agent bridge 422 in FIG. 4.

The agent bridge starts an interval time at the beginning of the trading round within the trading window (step 602). The agent bridge then gathers the weather data, energy consumption and production data, market rules, and orderbook (step 606) and formats this data for the CMS (step 608). The agent bridge then passes the formatted data to the CMS (step 610) after which process 600 ends.

Figure 7:
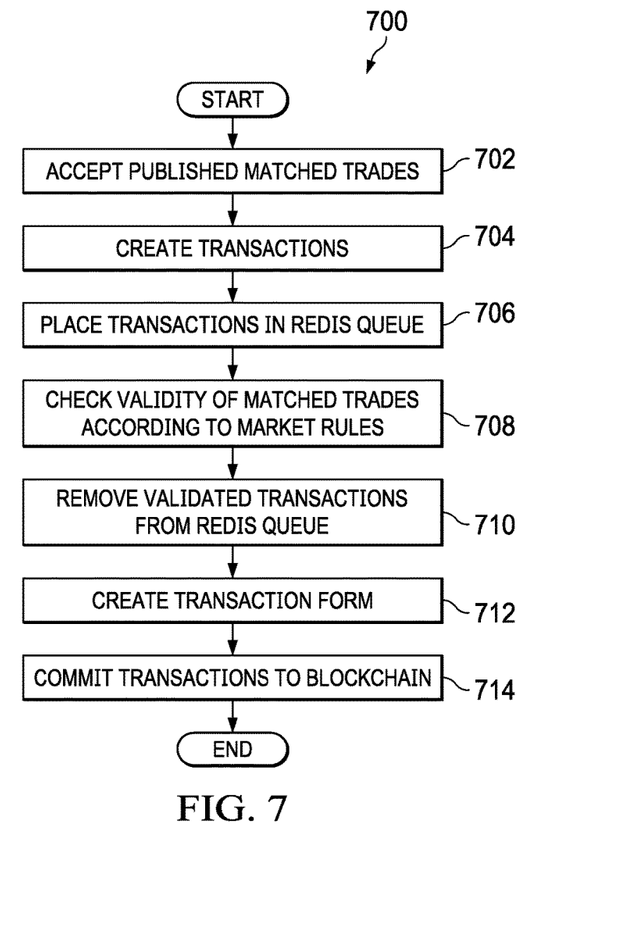
FIG. 7 depicts a flowchart illustrating a process for committing matched trains to the blockchain in accordance with an illustrative embodiment.

FIG. 7 depicts a flowchart illustrating a process for committing matched trains to the blockchain in accordance with an illustrative embodiment. Process 700 is a more detailed example of step 516 in FIG. 5, which is performed by the relayer, such as relayer 434 in FIG. 4. Process 700 helps to integrate the high frequency trading throughput of the smart agents with the slow resilience of blockchain operations.

The relayer accepts the matched trades published to the message queue (step 702) and creates transactions from them (step 704). The relayer then places the transactions in a Redis queue (step 706).

The relayer checks the validity of the matched ensuring they are within the market rules and reports back to the matching engine (step 708). Validated transactions are removed from the Redis queue (step 710).

The relayer then creates the correct form for the validated transactions (step 712) and commits the transactions to the blockchain (step 714). Process 700 then ends.

Figure 8:
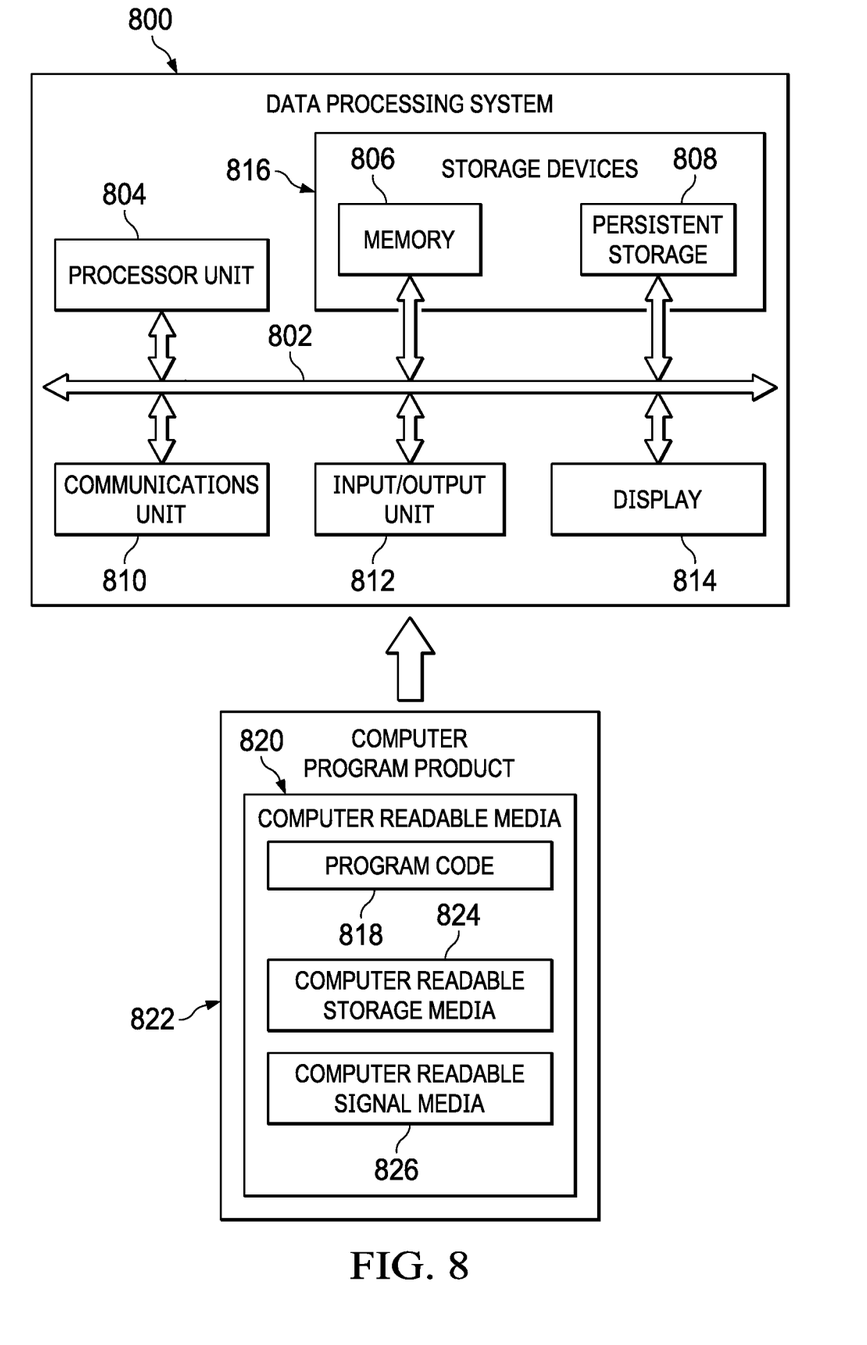
FIG. 8 depicts a block diagram of a data processing system in accordance with an illustrative embodiment.

Turning now to FIG. 8, a block diagram of a data processing system is depicted in accordance with an illustrative embodiment. Data processing system 800 can be used to implement server computer 104, server computer 106, client devices 110, in FIG. 1. Further, data processing system 800 can also be used to implement one more components in energy trading system 200 in FIG. 2. In this illustrative example, data processing system 800 includes communications framework 802, which provides communications between processor unit 804, memory 806, persistent storage 808, communications unit 810, input/output (I/O) unit 812 and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor.

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

Persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program code, computer usable program code, or computer-readable program code that can be read and executed by a processor in processor unit 804. The program code in the different embodiments can be embodied on different physical or computer-readable storage media, such as memory 806 or persistent storage 808.

Program code 818 is located in a functional form on computer-readable media 820 that is selectively removable and can be loaded onto or transferred to data processing system 800 for execution by processor unit 804. Program code 818 and computer-readable media 820 form computer program product 822 in these illustrative examples. In the illustrative example, computer-readable media 820 is computer-readable storage media 824.

In these illustrative examples, computer-readable storage media 824 is a physical or tangible storage device used to store program code 818 rather than a medium that propagates or transmits program code 818.

Alternatively, program code 818 can be transferred to data processing system 800 using a computer-readable signal media 826. The computer-readable signal media 826 can be, for example, a propagated data signal containing program code 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 820" can be singular or plural. For example, program code 818 can be located in computer-readable media 820 in the form of a single storage device or system. In another example, program code 818 can be located in computer-readable media 820 that is distributed in multiple data processing systems. In other words, some instructions in program code 818 can be located in one data processing system while other instructions in program code 818 can be located in a separate data processing system. For example, a portion of program code 818 can be located in computer-readable media 820 in a server computer while another portion of program code 818 can be located in computer-readable media 820 located in a set of client computers.

The different components illustrated for data processing system 800 are not meant to provide architectural limitations to the manner in which different embodiments can be implemented. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program code 818.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 806, or portions thereof, may be incorporated in processor unit 804 in some illustrative examples.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of distributed energy trading settlement, the method comprising:
 using a number of processors to perform the steps of:
  polling a number of Internet-of-Things (IoT) devices for energy consumption and production data for a specified preceding time interval;
  receiving weather data from a weather application programming interface (API) for the specified preceding time interval;
  receiving, from a central modelling solution, a number of bids and offers, within a specified trading window, based on the data from the IoT devices and weather API;
  creating orders from the bids and offers;
  matching at least a subset of the orders to create a number of matched trades;
  publishing the matched trades to a message queue;
  committing the published matched trades as transactions in a blockchain; and
  transferring tokens between user wallets according to the transactions in the blockchain.

2. The method of claim 1, further comprising:
 calculating a difference between traded energy volumes in the transactions and actual volume of energy used during a subsequent time interval; and
 transferring tokens between the user wallets to reconcile the difference.

3. The method of claim 1, wherein the bids and offers are generated by a number of trading agents that are hosted by the central modelling solution, wherein the trading agents are trained with historic energy use data and are linked to respective user profiles.

4. The method of claim 3, wherein trades not matched among the orders are published as an orderbook to the trading agents via the message queue.

5. The method of claim 1, wherein the orders are submitted to a matching engine via Financial Information Exchange protocol.

6. The method of claim 1, wherein the blockchain validates each matched trade to ensure:
 correct format;
 the creation time of a programmed time unit (PTU) for the matched trade is before the PTU begins;
 the PTU is within the specified trading window; and
 matching price is within specified market rules for the PTU.

7. The method of claim 1, further comprising triggering a new cycle of bids and offers within the trading window after the matched trades are published to the message queue.

8. The method of claim 1, wherein the central modelling solution infers a number of trading agents with data comprising:
 weather data provided by the weather API;
 energy consumption provided by the IoT devices;
 energy production provided by the IoT devices;
 market rules comprising minimum and maximum prices; and
 a market orderbook.

9. The method of claim 1, wherein the IoT devices comprise smart meters.

10. The method of claim 1, wherein the specified trading window comprises a number of cycles of bids and offers controlled by an interval timer within an agent bridge that transfer the data from the IoT devices to the central modelling solution.

11. A system for distributed energy trading settlement, the system comprising:
 a storage device configured to store program instructions; and
 one or more processors operably connected to the storage device and configured to execute the program instructions to cause the system to:
  poll a number of Internet-of-Things (IoT) devices for energy consumption and production data for a specified preceding time interval;
  receive weather data from a weather application programming interface (API) for the specified preceding time interval;
  receive, from a central modelling solution, a number of bids and offers, within a specified trading window, based on the data from the IoT devices and weather API;
  create orders from the bids and offers;
  match at least a subset of the orders to create a number of matched trades;
  publish the matched trades to a message queue;
  commit the published matched trades as transactions in a blockchain; and
  transfer tokens between user wallets according to the transactions in the blockchain.

12. The system of claim 11, wherein the processors further execute instructions to:
 calculate a difference between traded energy volumes in the transactions and actual volume of energy used during a subsequent time interval; and
 transfer tokens between the user wallets to reconcile the difference.

13. The system of claim 11, wherein the bids and offers are generated by a number of trading agents that are hosted by the central modelling solution, wherein the trading agents are trained with historic energy use data and are linked to respective user profiles.

14. The system of claim 13, wherein trades not matched among the orders are published as an orderbook to the trading agents via the message queue.

15. The system of claim 11, wherein the orders are submitted to a matching engine via Financial Information Exchange protocol.

16. The system of claim 11, wherein the blockchain validates each matched trade to ensure:
 correct format;
 the creation time of a programmed time unit (PTU) for the matched trade is before the PTU begins;
 the PTU is within the specified trading window; and
 matching price is within specified market rules for the PTU.

17. The system of claim 11, wherein the processors further execute instructions to trigger a new cycle of bids and offers within the trading window after the matched trades are published to the message queue.

18. The system of claim 11, wherein the central modelling solution infers a number of trading agents with data comprising:
 weather data provided by the weather API;
 energy consumption provided by the IoT devices;
 energy production provided by the IoT devices;
 market rules comprising minimum and maximum prices; and
 a market orderbook.

19. The system of claim 11, wherein the IoT devices comprise smart meters.

20. The system of claim 11, wherein the specified trading window comprises a number of cycles of bids and offers controlled by an interval timer within an agent bridge that transfer the data from the IoT devices to the central modelling solution.

21. A non-transitory computer program product for distributed energy trading settlement, the computer program product comprising a computer-readable storage medium having program instructions embodied therewith, the program instructions executable by a computer system to cause the computer system to perform a method of:
   polling a number of Internet-of-Things (IoT) devices for energy consumption and production data for a specified preceding time interval;
   receiving weather data from a weather application programming interface (API) for the specified preceding time interval;
   receiving from a central modelling solution, a number of bids and offers, within a specified trading window, based on the data from the IoT devices and weather API;
   creating orders from the bids and offers;
   matching at least a subset of the orders to create a number of matched trades;
   publishing the matched trades to a message queue;
   committing the published matched trades as transactions in a blockchain; and
   transferring tokens between user wallets according to the transactions in the blockchain.

22. The computer program product of claim 21, further comprising instructions for:
   calculating a difference between traded energy volumes in the transactions and actual volume of energy used during a subsequent time interval; and
   transferring tokens between the user wallets to reconcile the difference.

23. The computer program product of claim 21, wherein the bids and offers are generated by a number of trading agents that are hosted by the central modelling solution, wherein the trading agents are trained with historic energy use data and are linked to respective user profiles.

24. The computer program product of claim 23, wherein trades not matched among the orders are published as an orderbook to the trading agents via the message queue.

25. The computer program product of claim 21, wherein the orders are submitted to a matching engine via Financial Information Exchange protocol.

26. The computer program product of claim 21, wherein the blockchain validates each matched trade to ensure:
   correct format;
   the creation time of a programmed time unit (PTU) for the matched trade is before the PTU begins;
   the PTU is within the specified trading window; and
   matching price is within specified market rules for the PTU.

27. The computer program product of claim 21, further comprising instructions for triggering a new cycle of bids and offers within the trading window after the matched trades are published to the message queue.

28. The computer program product of claim 21, wherein the central modelling solution infers a number of trading agents with data comprising:
   weather data provided by the weather API;
   energy consumption provided by the IoT devices;
   energy production provided by the IoT devices;
   market rules comprising minimum and maximum prices; and
   a market orderbook.

29. The computer program product of claim 21, wherein the IoT devices comprise smart meters.

30. The computer program product of claim 21, wherein the specified trading window comprises a number of cycles of bids and offers controlled by an interval timer within an agent bridge that transfer the data from the IoT devices to the central modelling solution.

* * * * *